(No Model.)
C. A. BOGARDUS.
ELECTRIC BELT.
No. 455,680. Patented July 7, 1891.
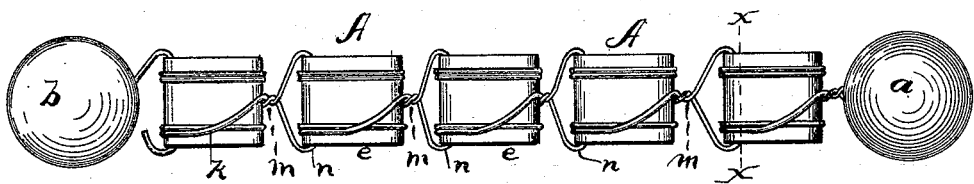
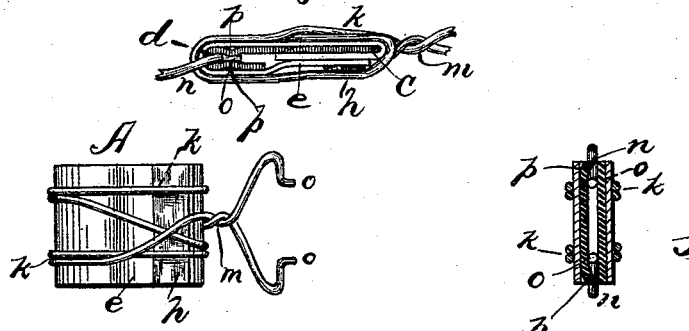
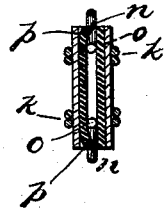
Witnesses
H. A. Carhart
C. B. Kinne
Charles A. Bogardus Inventor
By his Attorneys
Smith & Denison

UNITED STATES PATENT OFFICE.

CHARLES A. BOGARDUS, OF SYRACUSE, NEW YORK.

ELECTRIC BELT.

SPECIFICATION forming part of Letters Patent No. 455,680, dated July 7, 1891.

Application filed February 24, 1891. Serial No. 382,329. (No model.)

*To all whom it may concern:*

Be it known that I, CHARLES A. BOGARDUS, of Syracuse, in the county of Onondaga, in the State of New York, have invented new and useful Improvements in Electric Belts, of which the following, taken in connection with the accompanying drawings, is a full, clear, and exact description.

My invention relates to electric belts designed to be worn as a remedial agent.

My object is to produce a belt composed of multiple battery-cells connected together by suitable wiring, but not hinged together, and provided with a positive and a negative pole upon the respective ends, to which the wiring is connected, said cells consisting of sheets of zinc folded over at one end, a covering of absorbent material, and wire wound around over the absorbent as many times as desired, then bent inwardly from the outermost coil, then twisted close to the edge of the cell-body, then bent outwardly and hooked over inwardly, and having the points of the hooks bent outwardly at substantially a right angle, said hooks entering the ends of the fold and the outer ends lying between the body and the fold, so that the hooks cannot turn as hinge-pintles nor the cells turn on the hooks, and when a sufficient number of cells are so secured together the poles are connected to the ends of the multiple-cell battery.

My invention consists in the several novel features of construction, which are hereinafter specifically described, and are set forth in the claims hereunto annexed. It is constructed as follows, reference being had to the accompanying drawings, in which—

Figure 1 is a side elevation of a series of battery-cells connected together and having the poles connected to the ends. Fig. 2 is an edge elevation of one cell detached. Fig. 3 is an elevation of the opposite face of a cell from what is shown in Fig. 1. Fig. 4 is a vertical transverse section of a cell on the line $x\ x$ in Fig. 1.

A A are the cells, and $a\ b$ are the positive and negative poles connected to the extremities of the series of cells. Each cell consists of a flat sheet of zinc $c$ or analogous metal, having one end folded over, as at $d$, nearly onto the body of the sheet. A sheet of proper or suitable absorbent $e$ is then wrapped around the sheet, substantially as shown, with its ends overlapping. I then take a strip of copper $h$ or other proper metallic conductor and apply it to the absorbent. I then wind an annealed wire $k$ around the cell-body lengthwise in contact with both the paper and the strip $h$, but not with the zinc, drawing the ends inward to substantially the center, then twist them, as at $m$, which tightens the wire around the cell and prevents the coils or winds from slipping off on the ends. I then bend the ends outwardly from the twist, then inwardly, forming the hooks $n$, and then forward, creating the arms $o$. I then insert the hooks and arms into the space between the body of the zinc and the fold-over, the arms being longitudinal to the zinc and cell. I then crimp the zinc inwardly, as at $p$, and this not only brings the arms and hooks into perfect electrical contact with the zinc, but also locks the hooks and arms, so that they cannot turn nor act as the pintles of hinges between the cells and cannot accidentally unhook, so as to break the circuit. When thus a series of cells are connected together and the poles are connected to the outermost cells, I have a battery of multiple cells not hinged together and not pliable or flexible, except as the connecting-wires are bent. This battery is dipped into an acid solution, saturating the absorbent and creating an electric current through the cells from pole to pole, the copper strip $h$ operating as the positive connections of each cell to the wires.

What I claim as my invention, and desire to secure by Letters Patent, is—

1. In an electric belt, the combination of a flat zinc folded over on one end, a covering of absorbent material, a wire wound around over the absorbent, then twisted at one end of the zinc and absorbent, then bent outwardly from the twist, then bent inwardly, forming hooks, and bent to form forward-projecting points.

2. In an electric belt, the combination of a flat zinc folded over on one end, a covering of absorbent material, a wire wound around over the absorbent and over a copper strip on the absorbent, then brought together and twisted close to the end of the zinc, then bent outwardly from the twist, then bent inwardly, forming hooks, and bent to form forward-projecting points, said hooks being secured in the crimped fold of the adjoining zinc.

In witness whereof I have hereunto set my hand this 17th day of February, 1891.

CHARLES A. BOGARDUS.

In presence of—
HOWARD P. DENISON,
C. B. KINNE.